(12) United States Patent
Srnec et al.

(10) Patent No.: US 11,571,946 B2
(45) Date of Patent: Feb. 7, 2023

(54) METHODS AND SYSTEMS FOR OPERATING TRANSPORT CLIMATE CONTROL SYSTEMS TO IMPROVE SLEEP

(71) Applicant: THERMO KING LLC, Minneapolis, MN (US)

(72) Inventors: Matthew Srnec, Minnetonka, MN (US); Peter J. Loomis, Roseville, MN (US)

(73) Assignee: Thermo King LLC, Minneapolis, MN (US)

( * ) Notice: Subject to any disclaimer, the term of this patent is extended or adjusted under 35 U.S.C. 154(b) by 280 days.

(21) Appl. No.: 16/863,443

(22) Filed: Apr. 30, 2020

(65) Prior Publication Data

US 2021/0339603 A1    Nov. 4, 2021

(51) Int. Cl.
*B60H 1/00* (2006.01)
*B60H 1/32* (2006.01)

(52) U.S. Cl.
CPC ..... *B60H 1/00742* (2013.01); *B60H 1/00892* (2013.01); *B60H 1/3205* (2013.01)

(58) Field of Classification Search
CPC ............ B60H 1/00742; B60H 1/00892; B60H 1/3205
See application file for complete search history.

(56) References Cited

U.S. PATENT DOCUMENTS

| | | | |
|---|---|---|---|
| 2005/0231342 A1* | 10/2005 | Kim | G08B 21/02 340/575 |
| 2010/0241309 A1* | 9/2010 | Demirdjian | B60R 21/015 701/45 |
| 2015/0028996 A1* | 1/2015 | Agrafioti | A61B 5/318 340/5.82 |
| 2016/0176409 A1* | 6/2016 | Kirsch | B60N 2/02 701/1 |
| 2018/0320956 A1* | 11/2018 | Schumacher | B60H 1/3232 |
| 2019/0200872 A1* | 7/2019 | Matsuoka | A61B 5/0013 |

* cited by examiner

*Primary Examiner* — Marc E Norman
(74) *Attorney, Agent, or Firm* — Hamre, Schumann, Mueller & Larson, P.C.

(57) ABSTRACT

Methods of controlling transport climate control systems are provided to reduce the impact of their operation on the sleep of an occupant, who can be in a nearby sleeping space. Methods include obtaining occupant sleep status data, determining one or more operational parameters of the transport climate control system based on the occupant sleep status data, and operating the transport climate control system according to the one or more operational parameters to control when at least one of a motor, a compressor, a generator, or one or more fans are in operation during an occupant sleep state. The methods can be implemented by a controller of a transport climate control system or a control module for such a system.

17 Claims, 8 Drawing Sheets

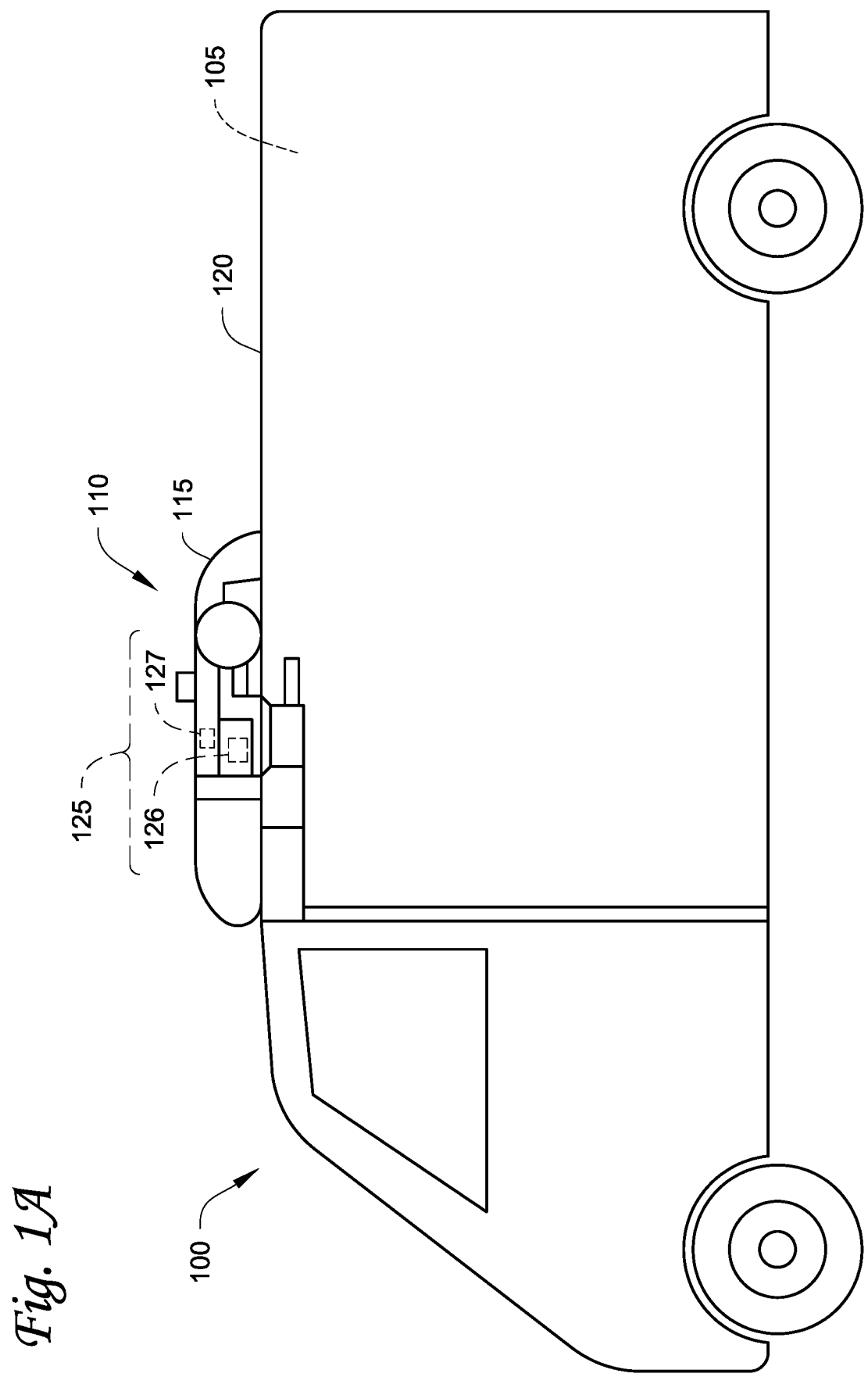

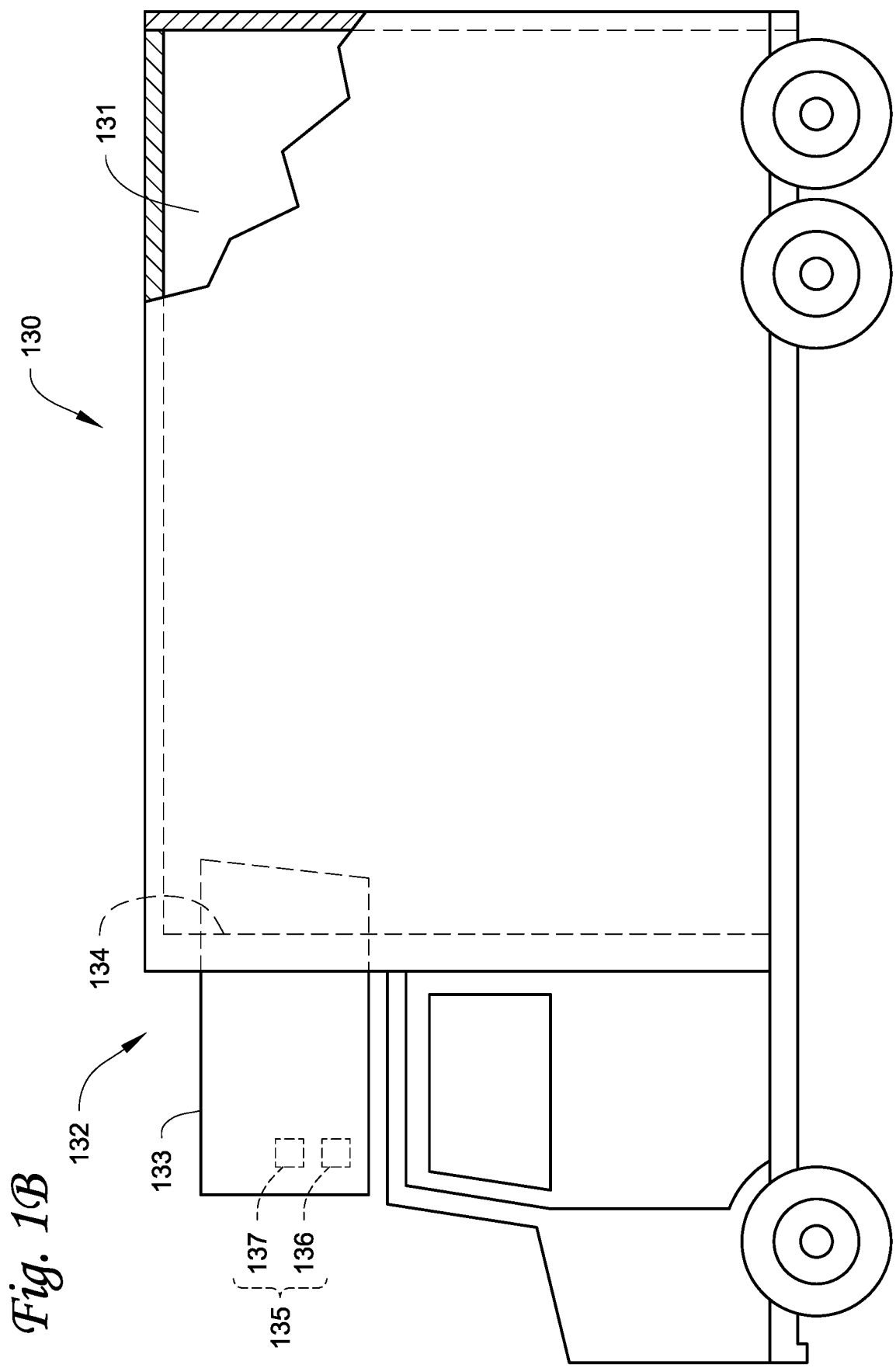

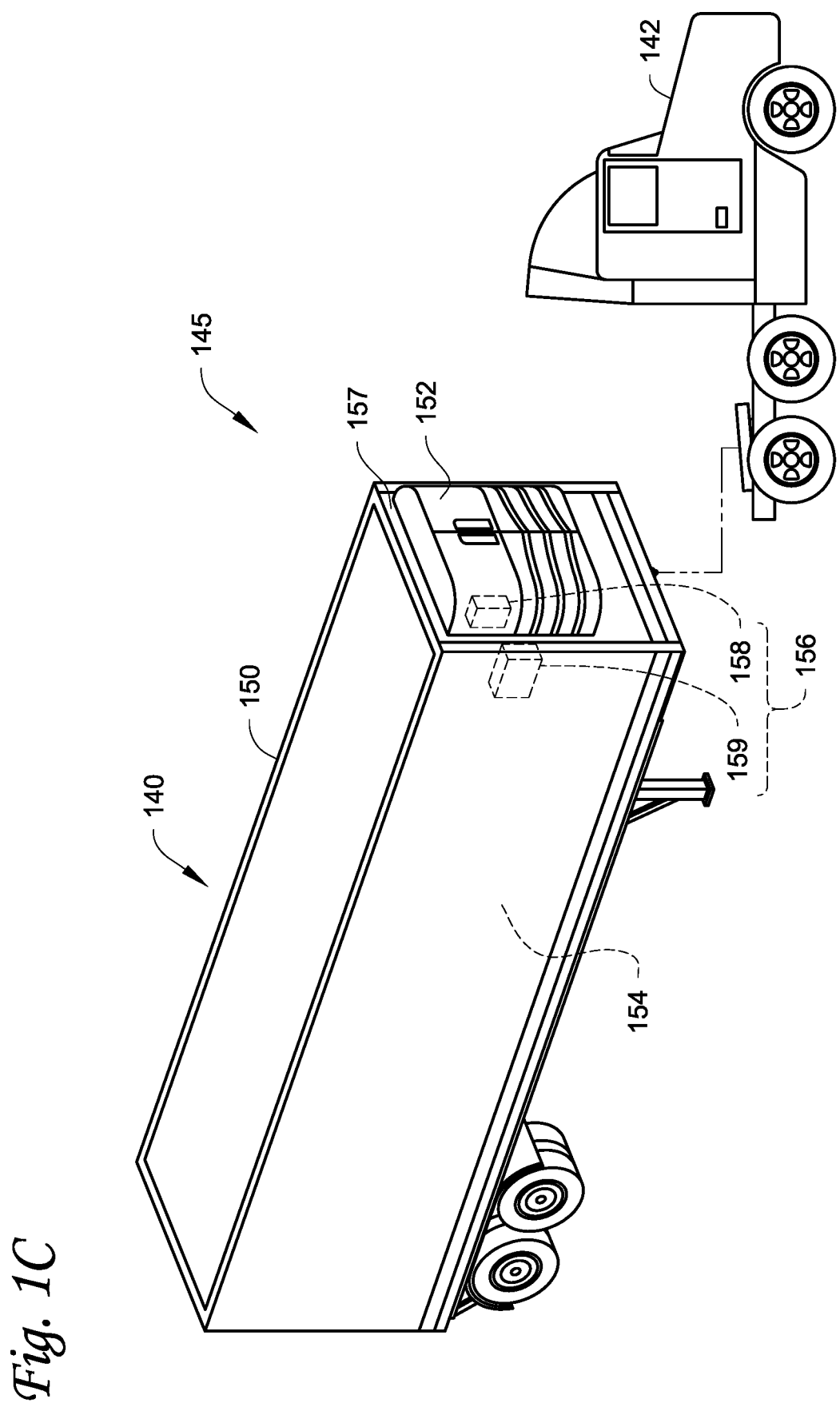

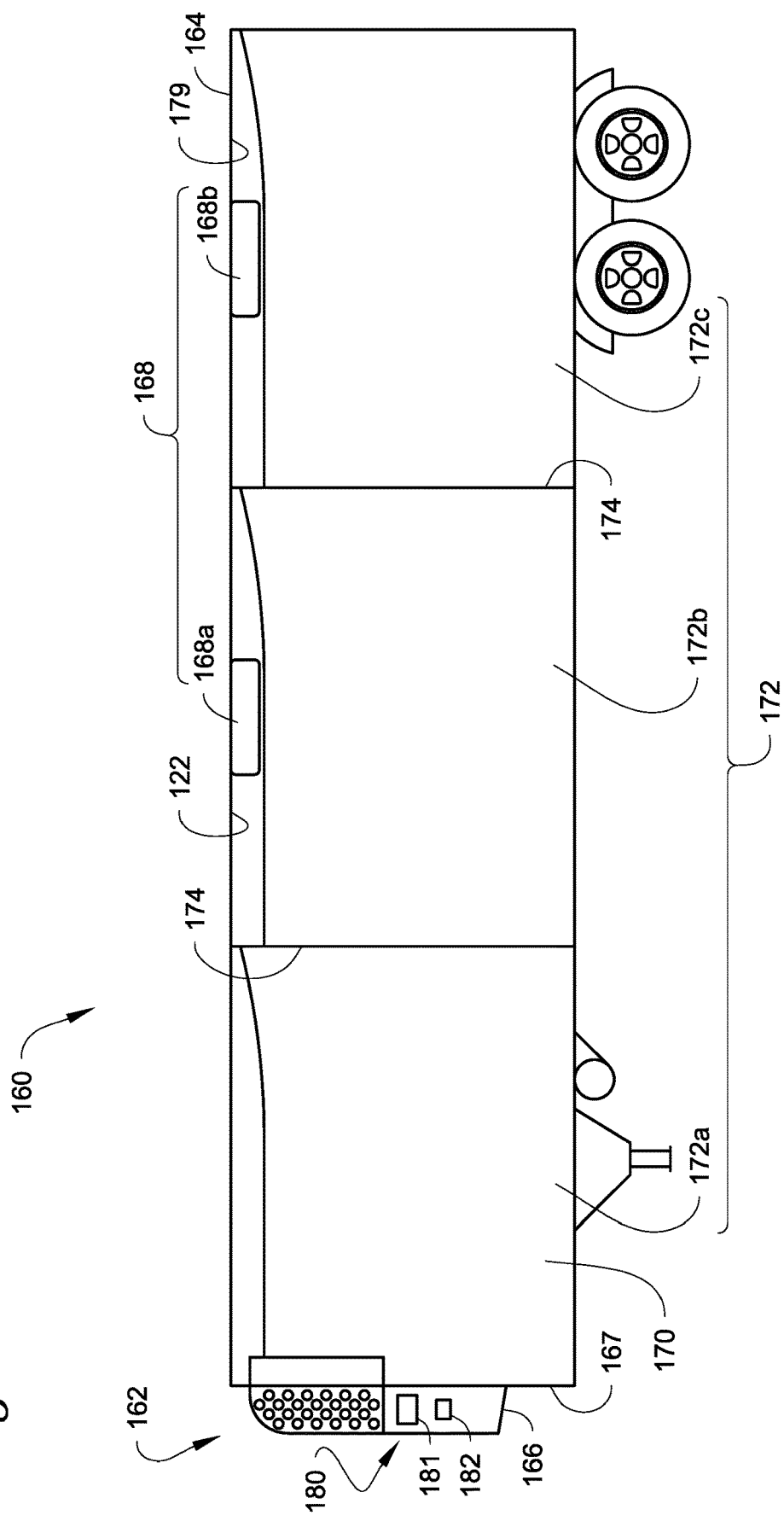

METHODS AND SYSTEMS FOR OPERATING TRANSPORT CLIMATE CONTROL SYSTEMS TO IMPROVE SLEEP

FIELD

This disclosure is directed to transport climate control systems, and more particularly for methods and systems for operating a transport climate control system to improve sleep of a person in proximity to the transport climate control system.

BACKGROUND

A transport climate control system is generally used to control environmental condition(s) (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The transport climate control system can include, for example, a transport refrigeration system (TRS) and/or a heating, ventilation, air conditioning and refrigeration (HVACR) system. The TRS can control environmental condition(s) within the climate controlled space to maintain cargo (e.g., produce, frozen foods, pharmaceuticals, etc.). The HVACR system can control environmental conditions(s) within the climate controlled space to provide passenger comfort for passenger(s) travelling in the transport unit. In some transport units, the transport climate control system can be installed externally (e.g., on a rooftop of the transport unit, on a front wall of the transport unit, on a side wall of the transport unit, etc.).

Transport climate control systems may be used for trips extending multiple days. Further, drivers of vehicles including transport climate control systems are often regulated to limit road hours and require time to sleep or otherwise rest. The space or spaces where climate is controlled by transport climate control systems typically require climate control even when the vehicle is not in transit.

Auxiliary power units (APUs) are an example of a finite power storage unit that can be used with vehicles such as semi-tractors to provide power to vehicle accessories when the primary power source (e.g., tractor engine, high voltage battery source, etc.) is turned off (i.e., deactivated). This can reduce fuel consumption, maintenance costs, emissions, and noise generated by not requiring the tractor main power source to operate (e.g., idle when the main power source is a tractor engine) during occupant rest periods or other periods of vehicle non-movement.

An example of one of the vehicle accessories powered by the APU may be a HVACR system that maintains a desired climate setting (e.g., temperature, humidity, airflow, etc.) within the cabin of the tractor. The HVACR system can help maintain a safe and comfortable environment that allows passenger(s) to rest within the sleeper cabin. Other vehicle accessories that can be powered by finite power storage units include, for example, transport climate control units, hotel loads such as cabin electronics, entertainment systems and appliances, etc.

SUMMARY

This disclosure is directed to transport climate control systems, and more particularly for methods and systems for operating a transport climate control system to improve sleep of a person in proximity to the transport climate control system.

Components of transport climate control systems, particularly rotational components such as generators, motors, compressors, and fans, may produce noise and vibration disruptive to sleep for those in proximity to the transport climate control system. The embodiments described herein can assist in improving sleep of an occupant resting in a sleeper cabin or other accommodation within a vehicle towing the transport climate control system.

By using sleep information such as times of day and schedules, such as limits on working hours indicative of when an operator will rest, occupant time, biometrics, manual settings, or the like, operation of the transport climate control system may be adjusted to reduce impact on occupant sleep quality. In an embodiment, operation of transport climate control components may be performed at times outside of an occupant's sleep schedule. In an embodiment, the operation of transport climate control system components may be performed at times where it is less disruptive to occupant sleep. The disruptiveness of operations to occupant sleep can be determined based on time, such as whether the operation would occur during deeper parts of a typical sleep cycle, and/or through biometric feedback on sleep such as movement data, pulse, and/or other suitable biometrics. The biometrics may be used to create an individualized sleep profile used to control operation of the transport climate control system components.

In an embodiment, a method of operating a transport climate control system includes obtaining occupant sleep status data, determining one or more operational parameters of the transport climate control system based on the occupant sleep status data, and operating the transport climate control system according to the one or more operational parameters to control when at least one of a motor, a compressor, a generator, or one or more fans are in operation during an occupant sleep state.

In an embodiment, the occupant sleep status data includes an occupant sleep schedule.

In an embodiment, the occupant sleep status data includes a driving time of a vehicle including the transport climate control system.

In an embodiment, the occupant sleep status data includes occupant biometric data.

In an embodiment, the one or more operational parameters include at least one of a temperature set point of the transport climate control system or a permitted drift from a set point of the transport climate control system.

In an embodiment, the method further includes charging a Rechargeable Energy Storage Source (RESS) (e.g., a battery) prior to the occupant sleep state.

In an embodiment, operating the transport climate control system according to the one or more operational parameters comprises prohibiting operation of at least one of the motor, the compressor, the generator, or the one or more fans during a period defined based on an occupant sleep stage. In an embodiment, the period defined based on the occupant sleep stage includes one or more periods associated with Stage 1 non-REM sleep. In an embodiment, the one or more periods associated with Stage 1 non-REM sleep are identified based on occupant biometric data. In an embodiment, the one more periods associated with Stage 1 non-REM sleep are identified based on a schedule of predicted sleep stages.

In an embodiment, a transport climate control system includes a motor, a climate control circuit including a compressor and one or more fans; and a controller. The controller is configured to obtain occupant sleep status data, determine one or more operational parameters of the transport climate control system based on the occupant sleep status data, and operate the transport climate control system according to the one or more operational parameters to control when at least one of the motor, the compressor, or the one or more fans are in operation during an occupant sleep state.

In an embodiment, the transport climate control system further includes a generator. The controller is also configured to operate the transport climate control system according to the one or more operational parameters to control when a generator is in operation during an occupant sleep state.

In an embodiment, the transport climate control system further includes a biometric reader. In an embodiment, the biometric reader is a wearable device and the biometric reader configured to communicate with the controller through wireless connection.

In an embodiment, a control module for a transport climate control system includes a controller. The controller is configured to obtain occupant sleep status data, determine one or more operational parameters of the transport climate control system based on the occupant sleep status data, and operate the transport climate control system according to the one or more operational parameters to control when at least one of the motor, the compressor, or the one or more fans are in operation during an occupant sleep state.

In an embodiment, the controller is configured to direct operation the transport climate control system according to the one or more operational parameters to control when a generator is in operation during an occupant sleep state.

In an embodiment, the control module further includes a wireless communication antenna, and the controller is configured to obtain data from a biometric reader from the wireless communication antenna.

DRAWINGS

FIG. 1A illustrates one embodiment of a climate-controlled van that includes a climate controlled space and a transport climate control system.

FIG. 1B illustrates one embodiment of a climate-controlled straight truck that includes a climate controlled space and a transport climate control system.

FIG. 1C illustrates one embodiment of a climate controlled transport unit attached to a tractor.

FIG. 1D illustrates another embodiment of a climate controlled transport unit that can be attached, for example, to a tractor.

DETAILED DESCRIPTION

Figure 1E:
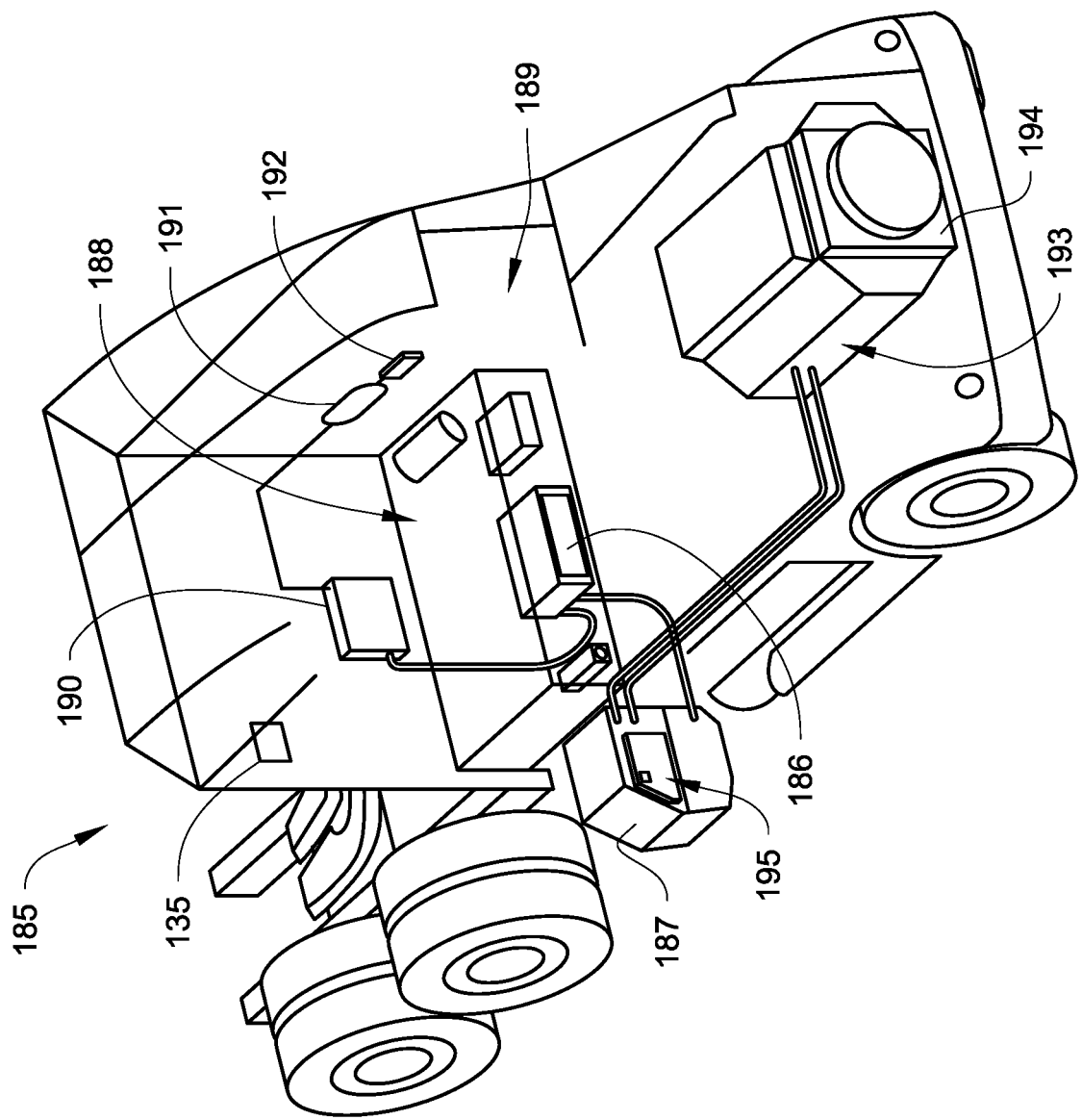
FIG. 1E illustrates one embodiment of a tractor having a HVACR system powered by a finite power storage unit and vehicle accessory system to provide climate control within a cabin of the tractor.

This disclosure is directed to transport climate control systems, and more particularly for methods and systems for operating a transport climate control system to improve sleep of a person in proximity to the transport climate control system.

Components of transport climate control systems, particularly rotational components such as generators, motors, compressors, and fans, may produce noise and vibration disruptive to sleep for those in proximity to the transport climate control system. The embodiments described herein can assist in improving sleep of an occupant resting in a sleeper cabin or other accommodation within a vehicle towing the transport climate control system.

FIG. 1A depicts a climate-controlled van 100 that includes a climate controlled space 105 for carrying cargo and a transport climate control system 110 for providing climate control within the climate controlled space 105. The transport climate control system 110 includes a climate control unit (CCU) 115 that is mounted to a rooftop 120 of the van 100. The transport climate control system 110 can include, amongst other components, a climate control circuit (see the climate control circuit 215 in FIG. 2) that connects, for example, a compressor, a condenser, an evaporator and an expansion device to provide climate control within the climate controlled space 105. It will be appreciated that the embodiments described herein are not limited to climate-controlled vans, but can apply to any type of transport unit (e.g., a truck, a container (such as a container on a flat car, an intermodal container, a marine container, etc.), a box car, a semi-tractor, a bus, or other similar transport unit), etc. The climate-controlled van 100 can include a sleeping area for an occupant such as a driver or other passenger of the climate-controlled van 100, for example within or connected to a cabin of the climate-controlled van 100.

The transport climate control system 110 also includes a programmable controller 125 and one or more sensors (not shown) that are configured to measure one or more parameters of the transport climate control system 110 (e.g., an ambient temperature outside of the van 100, an ambient humidity outside of the van 100, a compressor suction pressure, a compressor discharge pressure, a supply air temperature of air supplied by the CCU 115 into the climate controlled space 105, a return air temperature of air returned from the climate controlled space 105 back to the CCU 115, a humidity within the climate controlled space 105, etc.) and communicate parameter data to the controller 125. The controller 125 is configured to control operation of the transport climate control system 110 including the components of the climate control circuit. The controller 125 may comprise a single integrated control unit 126 or may comprise a distributed network of controller elements 126, 127. The number of distributed control elements in a given network can depend upon the particular application of the principles described herein. The controller 125 can further be configured to adjust operation of the transport climate control system 110 based on a sleep state of an occupant such as an operator of the climate-controlled van 100 when in a sleeping area.

FIG. 1B depicts a climate-controlled straight truck 130 that includes a climate controlled space 131 for carrying cargo and a transport climate control system 132. The transport climate control system 132 includes a CCU 133 that is mounted to a front wall 134 of the climate controlled space 131. The CCU 133 can include, amongst other components, a climate control circuit (see the climate control circuit 215 in FIG. 2) that connects, for example, a compressor, a condenser, an evaporator and an expansion device to provide climate control within the climate controlled space 131. The straight truck 130 can include a sleeping area for a driver or other passenger of the straight truck 130, for example in or attached to a cabin of the straight truck 130.

The transport climate control system 132 also includes a programmable controller 135 and one or more sensors (not shown) that are configured to measure one or more parameters of the transport climate control system 132 (e.g., an ambient temperature outside of the truck 130, an ambient humidity outside of the truck 130, a compressor suction pressure, a compressor discharge pressure, a supply air temperature of air supplied by the CCU 133 into the climate controlled space 131, a return air temperature of air returned from the climate controlled space 131 back to the CCU 133, a humidity within the climate controlled space 131, etc.) and communicate parameter data to the controller 135. The controller 135 is configured to control operation of the transport climate control system 132 including components of the climate control circuit. The controller 135 may comprise a single integrated control unit 136 or may comprise a distributed network of controller elements 136, 137. The number of distributed control elements in a given network can depend upon the particular application of the principles described herein. The controller 135 can further be configured to adjust operation of the transport climate control system 132 based on a sleep state of an occupant such as an operator of the straight truck 130 when in a sleeping area.

FIG. 1C illustrates one embodiment of a climate controlled transport unit 140 attached to a tractor 142. The climate controlled transport unit 140 includes a transport climate control system 145 for a transport unit 150. The tractor 142 is attached to and is configured to tow the transport unit 150. The transport unit 150 shown in FIG. 1C is a trailer. The tractor 142 attached to the transport unit 150 includes an occupant sleep area (not shown) within a cabin of the tractor 142.

The transport climate control system 145 includes a CCU 152 that provides environmental control (e.g. temperature, humidity, air quality, etc.) within a climate controlled space 154 of the transport unit 150. The CCU 152 is disposed on a front wall 157 of the transport unit 150. In other embodiments, it will be appreciated that the CCU 152 can be disposed, for example, on a rooftop or another wall of the transport unit 150. The CCU 152 includes a climate control circuit (see FIG. 2) that connects, for example, a compressor, a condenser, an evaporator and an expansion device to provide conditioned air within the climate controlled space 154.

The transport climate control system 145 also includes a programmable controller 156 and one or more sensors (not shown) that are configured to measure one or more parameters of the transport climate control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate controlled space 154, a return air temperature of air returned from the climate controlled space 154 back to the CCU 152, a humidity within the climate controlled space 154, etc.) and communicate parameter data to the controller 156. The controller 156 is configured to control operation of the transport climate control system 145 including components of the climate control circuit. The controller 156 may comprise a single integrated control unit 158 or may comprise a distributed network of controller elements 158, 159. The number of distributed control elements in a given network can depend upon the particular application of the principles described herein. The controller 156 can further be configured to adjust operation of the transport climate control system 145 based on a sleep state of an occupant such as an operator of the tractor 142 when in a sleeping compartment.

FIG. 1D illustrates another embodiment of a climate controlled transport unit 160. The climate controlled transport unit 160 includes a multi-zone transport climate control system (MTCS) 162 for a transport unit 164 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc. The truck, tractor, or other transport unit can include a sleeping area, for example in a cabin of a truck or tractor, where an occupant such as a driver or other passenger of the transport unit or attached vehicle may sleep.

The MTCS 162 includes a CCU 166 and a plurality of remote units 168 that provide environmental control (e.g. temperature, humidity, air quality, etc.) within a climate controlled space 170 of the transport unit 164. The climate controlled space 170 can be divided into a plurality of zones 172. The term "zone" means a part of an area of the climate controlled space 170 separated by walls 174. The CCU 166 can operate as a host unit and provide climate control within a first zone 172a of the climate controlled space 166. The remote unit 168a can provide climate control within a second zone 172b of the climate controlled space 170. The remote unit 168b can provide climate control within a third zone 172c of the climate controlled space 170. Accordingly, the MTCS 162 can be used to separately and independently control environmental condition(s) within each of the multiple zones 172 of the climate controlled space 162.

The CCU 166 is disposed on a front wall 167 of the transport unit 160. In other embodiments, it will be appreciated that the CCU 166 can be disposed, for example, on a rooftop or another wall of the transport unit 160. The CCU 166 includes a climate control circuit (see FIG. 2) that connects, for example, a compressor, a condenser, an evaporator and an expansion device to provide conditioned air within the climate controlled space 170. The remote unit 168a is disposed on a ceiling 179 within the second zone 172b and the remote unit 168b is disposed on the ceiling 179 within the third zone 172c. Each of the remote units 168a,b include an evaporator (not shown) that connects to the rest of the climate control circuit provided in the CCU 166.

The MTCS 162 also includes a programmable controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168a or 168b, a humidity within each of the zones 118, etc.) and communicate parameter data to a controller 180. The controller 180 is configured to control operation of the MTCS 162 including components of the climate control circuit. The controller 180 may comprise a single integrated control unit 181 or may comprise a distributed network of controller elements 181, 182. The number of distributed control elements in a given network can depend upon the particular application of the principles described herein. The controller 180 can further be configured to adjust operation of the MTCS 162 based on a sleep state of an occupant such as an operator of the tractor when in a sleeping area.

FIG. 1E illustrates one embodiment of a tractor 185 having a HVACR unit 186 powered by an APU 187 to provide climate control within a cabin of the tractor 185. The cabin includes a sleeping portion 188 and a driving portion 189 and a plurality of vehicle accessories (not shown). The cabin can be accessible via a driver side door (not shown) and a passenger side door (not shown). The cabin can include a primary HVAC system (not shown) as a vehicle accessory that can be configured to provide conditioned air within driving portion 189 and potentially the entire cabin, and the secondary HVAC system including the HVACR unit 186 for providing conditioned air within the sleeping portion 188. The cabin can also include a plurality of cabin accessories (not shown). Examples of cabin accessories can include, for example, sunshade(s) for a window/windshield of the tractor 185, a refrigerator, a television, a video game console, a microwave, one or more device charging station(s), a continuous positive airway pressure (CPAP) machine, and a coffee maker.

The HVACR unit 186 is controlled by a controller 190 and is connected to a display 191 and a communications link 192. The finite power storage unit and vehicle accessory system is controlled by the controller 190. The controller 190 is also connected to the APU 187 to control, monitor and receive data from the APU 187. The display 191 is separate from the controller 190. In other embodiments, the display 191 can be part of the controller 190. The controller 190 may also be connected to communications link 192 in order to communicate, for example, with a mobile device and/or with a remote server. The HVACR system can include sensors including, for example, a cabin temperature sensor, an ambient temperature sensor, etc. providing data to the controller 190.

The APU 187 is a power source that can include a prime mover and/or a power storage device such as a battery source to provide power to various loads including the vehicle accessory systems such as HVACR unit 186. The APU 187 may be a separate power source from a primary power source of the vehicle such as an alternator 193 coupled to a main engine 194 and/or the main battery (not shown). The APU 187 can act as a secondary power unit for the tractor 185 for use when the primary power source (e.g., alternator 193 coupled to the main engine 194) is unavailable. When, for example, the primary power source is unavailable, the APU 187 can be configured to provide power to one or more of the vehicle accessories (including, for example, cabin accessories; hotel loads such as, for example, appliances; a primary HVAC system; the HVACR unit 186; a starter for main engine 194; etc.).

In some embodiments, the APU 187 is electrically powered and can include, for example, one or more batteries. In other embodiments, the APU 187 can be mechanically powered, for example, by a prime mover. In one embodiment, the APU 187 can include a prime mover coupled to a belt to drive an alternator and a compressor of the HVACR unit 186. The prime mover of the APU 187 can be separate from the prime mover engine 194 acting as the primary power source of the tractor 185. In some embodiments, the prime mover of the APU 187 can be a diesel engine. The APU 187 can be attached to the tractor 185 using any attachment method such as being located in a compartment, bolted to a portion of the tractor 185, etc.

In some embodiments, the APU 187 can be turned on (i.e., activated) or off (i.e., deactivated) by an occupant (e.g., driver or passenger) of the tractor 185. The APU 187 generally may not be able to provide sufficient power for operating (e.g., driving) the tractor 185.

The APU 187 can have a finite amount of power that it can provide to vehicle accessories, for example, based on a fuel tank providing fuel to the APU 187, storage capability of batteries of the APU 187, etc. The APU 187 may include or be connected to a battery management system 195. The battery management system 195 may, for example, control the charging of a battery of the APU 187 based on parameters such as, for example, battery temperature. The battery management system 195 may, for example, evaluate the remaining useful life of a battery of the APU 187. The battery management system 195 may be directly connected to a battery included in the APU 187 or may communicate with the APU 187 by, for example, a CAN bus, ZigBee, RFID, etc. Components of the APU 187 may have RFID identifiers to provide information regarding part serial number, date of manufacture, etc.

The main engine 194 can provide sufficient power to operate (e.g., drive) the tractor 185 and any of a plurality of vehicle accessories (e.g., the primary HVAC system) and cabin accessories. In some embodiments, the main engine 194 is the only power source that provides power to the primary HVAC system. The main engine 194 can also provide power to charge, for example, batteries of the APU 187. In some embodiments, the main engine 194 can be a prime mover such as, for example, a diesel engine. In some embodiments, the main engine 194 can be an electric engine. In some embodiments, the main engine 194 can be a hybrid engine.

The controller 190 is configured to control operation of the HVACR system including components of the HVACR unit 186. The controller 190 may comprise a single integrated control unit or may comprise a distributed network of controller elements (not shown). The number of distributed control elements in a given network can depend upon the particular application of the principles described herein.

The controller 190 may include a processor and a memory. The processor may be configured to receive at least one of a climate condition setting (e.g., a temperature setting, a range of temperatures, a cooling or heating mode, a fan setting, etc.) and a runtime and compute a predicted runtime or condition setting for the HVACR unit 186 when it is powered by the APU 187. The memory may be configured to store various data regarding the HVACR unit 186 and the APU 187.

The controller 190 may be connected to the communications link 192. In some embodiments, the communications link 192 can be an antenna. In some embodiments, the communications link 192 may be a connection to the internet, such as a cellular data connection such as 3G, 4G or LTE, used to access, for example, a remote server, a mobile device (e.g. a cellular phone), etc. In an embodiment, the communications link 192 can be a short-range communications link, such as Bluetooth, Wi-Fi (for example according to an 802.11 standard), ZigBee, or a wired communications link such as a USB link. The short-range communications link may allow communication between the controller 190 and a device such as a mobile phone, which may in turn connect to a remote server via the internet, for example, via a cellular data connection.

The controller 190 can further be configured to adjust operation of the HVACR system based on a sleep state of an occupant such as an operator of the tractor 185 when in a sleeping area.

The display 191 may be used to provide a user with information, for example, a selected climate condition setting and a predicted runtime for that climate condition setting. The climate condition setting may be presented on the display 120 as, for example, a single set point temperature, two or more temperatures defining a temperature range for the HVACR unit 186 to operate within, an abstract expression of the condition setting (such as a value from 1-10, a color corresponding to a condition setting such as blue for conditions including colder temperature values or red for conditions including hotter temperature values, etc.), etc. The predicted runtime may be presented as, for example, a dial, a clock, a slider bar, a number, etc. corresponding to the predicted runtime. The display 191 may provide a user interface through which the user views and can manipulate one or more of the runtime and the condition setting values. The display 191 may include a control input, for example a touch-screen for interacting with the presented user interface. Other controls may be provided, for example dials, buttons, knobs, etc. In an embodiment, the display 191 can be a fixed display screen located, for example, in the cabin of the tractor 185. In an embodiment, a user interface on a mobile device can be used instead of the display 191 and the mobile device can connect to the controller 190 via the communications link 192.

Figure 2:
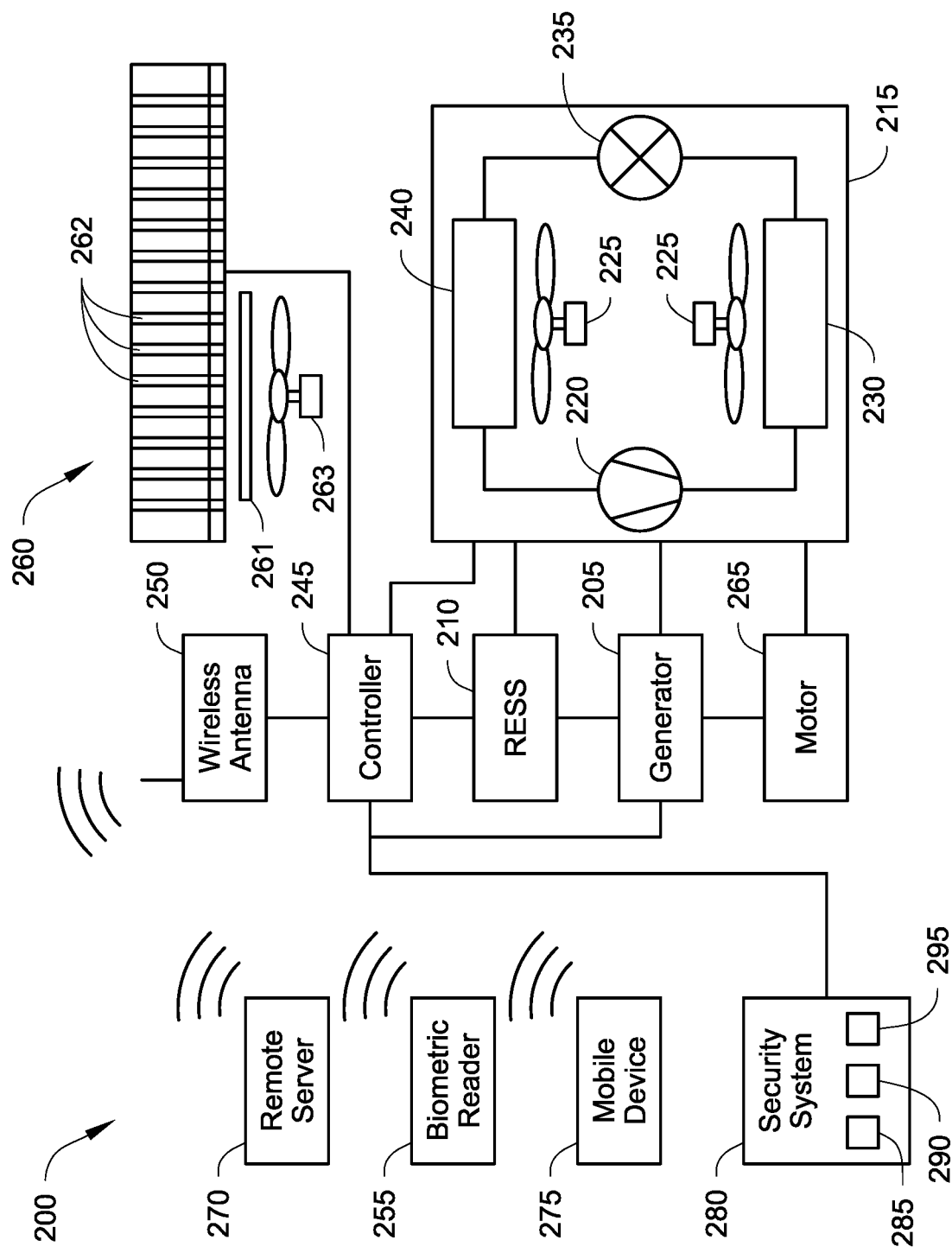
FIG. 2 illustrates a schematic of a transport climate control system according to an embodiment.

FIG. 2 shows a schematic of a transport climate control system 200 according to an embodiment. The transport climate control system 200 can be used in conjunction with any of the transport units and transport climate control systems shown in FIGS. 1A-E. The transport climate control system 200 includes a generator 205 and rechargeable energy storage system (RESS) 210. Transport climate control system 200 also includes a climate control circuit 215 including a compressor 220 and one or more fans 225, a first heat exchanger 230, an expansion device 235, and a second heat exchanger 240. Transport climate control system 200 further includes a controller 240. Transport climate control system 200 can optionally include wireless communication antenna 250, and optionally further include biometric sensor 255. Optionally, transport climate control system 200 can include a climate-controlled mattress 260.

Generator 205 is a generator configured to provide power to transport climate control system 200. In an embodiment, generator 205 can be connected to a motor 265 as a prime mover, such as a combustion engine and obtain power from the motor 265. In some embodiments, generator 205 is connected to an engine of a transport climate control system and disposed, for example, in a transport climate control unit (e.g., the CCU 152 shown in FIG. 1C). In some embodiments, generator 205 is connected to an engine of a vehicle including transport climate control system 200 to obtain power from the engine. In some embodiments, the generator 205 is connected to an engine and form a generator set (also referred to as a genset) that is separate from the transport climate control system and the vehicle. In these embodiments, the genset can be mounted, for example, to the vehicle and/or the transport unit.

RESS 210 is a rechargeable energy storage source configured to obtain and store power from generator 205, and also to provide power to transport climate control system 200. RESS 210 may include one or more rechargeable batteries configured to be charged by generator 205 and/or a connection to external power such as shore power from an electrical grid. RESS 210 may include, for example, a RESS management system to control operations of the RESS 210 such as charging, temperature management, and the like, and determine and/or communicate the status of the RESS such as a state of charge of the one or more batteries of the RESS 210.

In an embodiment, RESS 210 includes one or more rechargeable batteries. In an embodiment, RESS 210 is a fuel cell. RESS 210 can provide energy to the transport climate control system 200 with reduced noise and vibration than generator 205 and any attached motor 265. In an embodiment, RESS 210 provides energy to transport climate control system without producing noise or vibration that are perceptible in a crew compartment or sleeping space of a vehicle including transport climate control system 200. In some embodiments, the RESS 210 can be part of a transport climate control system (e.g., the transport climate control systems shown in FIGS. 1A-1D). In some embodiments, the RESS 210 can be part of the vehicle (e.g., a tractor such as the tractors 142 and 185 shown in FIGS. 1C and 1E). In some embodiments, the RESS 210 can be part of an APU (e.g., the APU 187 shown in FIG. 1E).

Climate control circuit 215 is a circuit configured to provide climate control to an internal space of or attached to a vehicle, such as a cargo space, a trailer, or the like. In an embodiment, climate control circuit 215 can further provide climate control to a cabin space of the vehicle. The climate control provided by climate control circuit 215 can include temperature, humidity, atmosphere, and/or airflow control. The climate control circuit 215 can include compressor 220, one or more fans 225, first heat exchanger 230, expansion device 235, and a second heat exchanger 240. Climate control circuit 215 can perform a refrigeration cycle using the circuit including compressor 220, first heat exchanger 230, expansion device 235, and second heat exchanger 240. In an embodiment, climate control circuit can also provide heating or cooling to a climate-controlled mattress 255.

Compressor 220 is a compressor configured to compress a working fluid in climate control circuit 215. Compressor 220 can be, for example, a reciprocating compressor, a scroll compressor, or any other suitable compressor for compressing a working fluid in a climate control circuit. In an embodiment, compressor 220 is an electrically powered compressor. Compressor 220 is one of the components controlled by controller 245 to control levels of noise and vibration based on a sleep status of a vehicle occupant such as a driver or other passenger of the vehicle.

Climate control circuit also includes one or more fans 225. The one or more fans 225 include evaporator fans configured to direct air over a heat exchanger serving as an evaporator in climate control circuit 215, such as first heat exchanger 230. First heat exchanger 230 is a heat exchanger receiving the working fluid from compressor 220 in climate control circuit 215. First heat exchanger 230 can allow the working fluid from compressor 220 to reject heat, for example rejecting heat to an ambient environment surrounding the climate control circuit 215, as part of a refrigeration cycle. The one or more fans 225 can be included among the components controlled by controller 245 to control levels of noise and vibration based on a sleep status of a vehicle occupant such as a driver or other passenger of the vehicle.

Expansion device 235 is a part of climate control circuit 215 that expands working fluid from the first heat exchanger 230. Working fluid passes from expansion device 235 to second heat exchanger 240, where the working fluid absorbs heat as part of the refrigeration cycle performed by climate control circuit 215. Working fluid from second heat exchanger 240 returns to compressor 220. Second heat exchanger 240 can have one or more of the fans 225 blowing air over the second heat exchanger to facilitate the transfer of heat at second heat exchanger 240. The fans 225 associated with second heat exchanger 240 can also be included among the components controlled by controller 245 to control levels of noise and vibration based on a sleep status of a vehicle occupant such as a driver or other passenger of the vehicle.

Controller 245 is a controller including a processor and a memory. In an embodiment, controller 245 can include one or more additional processors. In an embodiment, controller 245 can further include one or more storage memories. Controller 245 is configured to control operation of transport climate control system 200. Controller 245 is configured to determine operational parameters of the transport climate control system 200 based on current or expected sleep states for an occupant of the vehicle.

The current or expected sleep state for the occupant can be obtained by controller 245 or it can be determined by the controller 245. In an embodiment, a current or expected sleep state can be provided to controller 245 by biometric reader 255. In an embodiment, a current or expected sleep state can be determined based on a schedule. In an embodiment, the schedule is based on historical data, such as historical vehicle use data or historical occupant sleep status data. In an embodiment, the schedule is based on user-entered data. In an embodiment, a current or expected sleep state can be determined based on biometric data, such as data obtained from a biometric reader 255. The biometric data can include, for example heart rate, movement and/or restlessness, breathing rate and/or depth, or any other biological signs associated with current or predicted sleep states.

Controller 245 can determine one or more operational parameters for transport climate control system 200 based on a current sleep state. The operational parameters can be, for example, operation of particular components. In an embodiment, the operational parameters can include a source of power for operating components of the transport climate control system, for example using energy stored in RESS 210 instead of power from generator 205. For a current sleep state, the sleep state can be used to control the use of components of associated with noise or vibration, such as compressor 220, generator 205, motor 265, or fans 225. In an embodiment, one or more of those components can be prohibited from use during particular sleep states, such as stage 1 non-REM sleep, REM sleep, or any other stages. For example, generator 205 and motor 265 can be prohibited from use, and RESS 210 used to power compressor 220 and/or fans 225. In an embodiment, some sleep states can permit use of one or more of the components associated with noise or vibration. In an embodiment, only certain sleep states, such as stage 1 non-REM sleep can include restrictions or prohibitions on use of components associated with noise or vibration. In an embodiment, the association of sleep states with use of components associated with noise or vibration can be based on individual sleep data, such as biometric data on sleep quality data for a particular occupant. In an embodiment, the use of components associated with noise or vibration in a particular sleep state can be based on the susceptibility of that sleep state to disruption. In an embodiment, one or more temperature set points for the transport climate control system 200 can be modified, for example to reduce the use of the components associated with noise or vibration during the occupant sleep state. The modification of set points can be within boundaries established based on a load being carried in the space climate-controlled by transport climate control system 200, such as frozen foods, refrigerated perishables, medicines, or the like.

Controller 245 can also determine one or more operational parameters for transport climate control system 200 based on an anticipated sleep state. For an anticipated sleep state, controller 245 can, for example, direct charging of RESS 210 to increase the availability of stored power from RESS 210 during the anticipated sleep state, or lower a temperature in the space that is climate-controlled by transport climate control system 200 to provide a period where components associated with noise or vibration will not be utilized.

Controller 245 can operatively coupled to a wireless communication antenna 250 such that the controller 245 can obtain data from one or more other devices such as a remote server 270 and/or biometric sensor 255. Wireless communication antenna 250 can be, for example an antenna for at least one of Wi-Fi, Bluetooth, ZigBee, near-field communications (NFC), RFID, or any other suitable wireless connection capable of communicating data to and from controller 245 and one or more of a biometric sensor 255, a remote server 270, or any other mobile electronic device 275 such as a tablet, smart phone, or the like.

Biometric sensor 255 is a device including one or more sensors configured to sense biometric data of an occupant of the vehicle including transport climate control system 200. Biometric sensor 255 can be, for example, a wearable device such as a fitness tracker band, a mobile device such as a cellular phone, one or more sensors installed in a sleeping area of the vehicle including transport climate control system 200, or any other suitable device for capturing biometric data for an occupant of the vehicle. The biometric data can include movement such as resting motion or restless motion, sound such as snoring or coughing, body temperature, pulse i.e. heart rate, depth and/or frequency of breathing, or any other suitable biometric data that can be associated with a sleep state. Biometric sensor 255 can be operatively connected to the controller 245 such that it can provide data to controller 245, for example through wireless communications with the wireless communications antenna 250. In an embodiment, biometric sensor 255 can have a wired connection to controller 245. In an embodiment, biometric sensor 255 can provide biometric data to controller 245 that is processed at controller 245 to obtain a sleep state.

In an embodiment, controller 245 can use data from biometric sensor 255 to detect responses to operation of the transport climate control system 200 to determine effects of operations on occupant sleep. For example, if one or more noise or vibration-producing components of the transport climate control system 200 are operated based on a determination of the occupant being in a deep sleep state, the biometric sensor 255 can provide feedback on the effects of that operation on user sleep. This feedback can include information regarding or relating to changes in depth or quality of sleep, awakening of the occupant, or the like. The feedback can be used to alter how the transport climate control system 200 is operated in response to occupant sleep state. For example, the feedback from biometric sensor 255 during operation of transport climate control system 200 during an occupant sleep state could be processed to determine variations to the control based on occupant sleep state. Variations to control during occupant sleep state could include, for example, determining particular speeds for variable-speed components to be operated at, including or modifying the length of time an occupant is in a sleep state before performing the corresponding operations, changing the combinations of components in operation during an occupant sleep state to modify harmonics, or any other suitable modification to the operations based on their effects on occupant sleep recorded by the biometric sensor 255.

Optionally, a climate-controlled mattress 260 can be included as part of a transport climate control system 200. In an embodiment, climate-controlled mattress 260 includes a heating element, such as a resistive heating element 261. In an embodiment, climate-controlled mattress 260 can include a plurality of channels 262 for distributing air from an ambient environment or from an HVACR system to heat or cool the mattress 260. In an embodiment, air sourced from the ambient environment can be driven through the channels by a fan 263. In an embodiment, the HVACR system providing air to climate-controlled mattress 260 is a cabin HVACR system of the vehicle. In an embodiment, the HVACR system providing air to climate-controlled mattress 260 includes climate control circuit 215. In an embodiment, climate-controlled mattress 260 can be climate-controlled by ventilation of air through the channels, for example driven by a fan. In an embodiment, climate-controlled mattress 260 is controlled by controller 245 to control the temperature of the mattress based on a sleep state of an occupant such as a vehicle operator. In an embodiment, climate-controlled mattress 260 includes a controller configured to control the temperature of the mattress based on a sleep state of an occupant such as a vehicle operator. In an embodiment, the controller that controls the temperature of the climate-controlled mattress 260 is configured to obtain data from biometric sensor 255. In an embodiment, the controller that controls the temperature of the climate-controlled mattress 260 is configured to process biometric data to determine the sleep state of the occupant. In an embodiment, each of a plurality of sleep states are associated with set point temperatures, heater intensities, or fan speeds for the climate-controlled mattress 260. In an embodiment, an occupant can set the set point temperature, heater intensity, or fan speed of the climate-controlled mattress.

In an embodiment, one or more security features of a security system 280 can be integrated with climate control system 200 such that they are controlled by controller 240. Security system 280 can include, for example, door locks 285, motion detectors 290, or cameras 295. In an embodiment, controller 240 can ensure door locks 285 are locked during the occupant sleep state. In an embodiment, controller 240 can activate one or both of motion detectors 290 or cameras 295 during the occupant sleep state.

Figure 3:
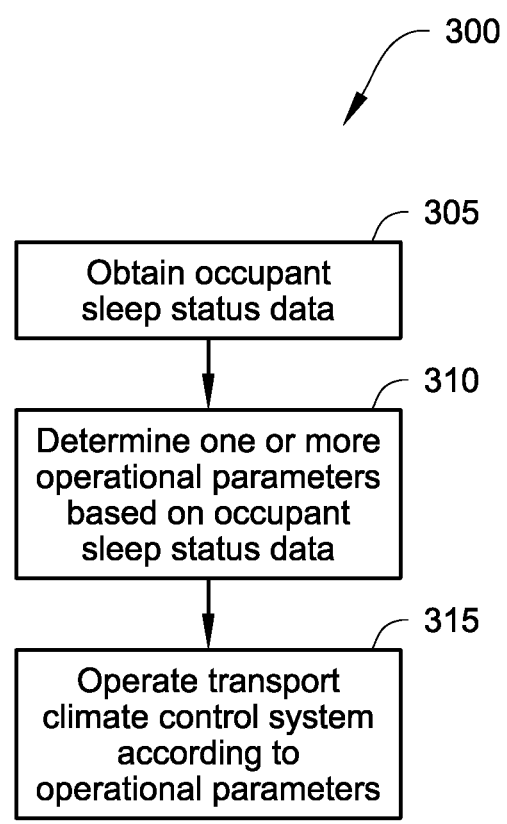
FIG. 3 illustrates a flowchart of a method of operating a transport climate control system, according to an embodiment.

FIG. 3 illustrates a flowchart of a method 300 of operating a transport climate control system (e.g., the transport climate control system 200 shown in FIG. 2). Method 300 includes a controller (e.g., the controller 245 shown in FIG. 2) obtaining occupant sleep status data 305, determining one or more operational parameters of the transport climate control system based on the occupant sleep status data 310, and operating the transport climate control system according to the one or more operational parameters 315.

Occupant sleep status data is obtained at 305. The occupant sleep status data is data regarding the sleep status of a person that will occupy a sleeping area in a vehicle including the transport climate control system. In an embodiment, the occupant is an operator of the vehicle such as a driver. In an embodiment, the sleeping area is in close proximity to the transport climate control system operated according to method 300, such that vibration or noise from the transport climate control system would be experienced by the occupant. In an embodiment, the occupant sleep status data is provided by a device such as a mobile device or a biometric sensor such as a wearable device. In an embodiment, the occupant sleep status data is obtained from a remote server, separate from the vehicle including the transport climate control system. In an embodiment a controller included in the determines a sleep state based on data such as time, biometric data, a schedule, vehicle trip status such as operation time, for example determined by setting on and off times or detection of the vehicle being in motion, constraints such as permitted operator driving time, and the like. The data used to determine sleep state can include, for example, one or more of data stored locally in a memory included in the controller, data obtained from a mobile device, data obtained from a biometric sensor, and data obtained from a remote server. In an embodiment, the occupant sleep status data is determined via processing at the remote server, mobile device, or biometric sensor. In an embodiment, the occupant sleep status data is determined by processing data at a controller included in the transport climate control system. The data processed by the controller can include data provided by one or more of the remote server, mobile device, or biometric sensor.

In an embodiment, the sleep status data is a stage of the sleep cycle. The sleep cycle includes Stage 0, when awake, Stage 1 and Stage 2, which are each considered to be light sleep stages, Stage 3, which is considered a deep sleep but not REM sleep, and REM sleep, the deepest sleep and associated with dreaming and with limited or no body movement. The stages can be characterized by biometric data or based on a schedule, such as an individual sleep schedule or aggregate data on typical sleep patterns. The stages can be associated with different susceptibilities to disruption, for example due to noise or vibration, and effects of such disruptions on sleep quality.

One or more operational parameters of the transport climate control system are determined based on the occupant sleep status data at 310. The one or more operational parameters can include, for example, set points for the transport climate control system, permission for particular components to operate, such as one or more of motors, generators, compressors, fans, and the like, permissible power sources for operations such as a RESS versus a generator or motor, schedules for operation of components such as one or more of motors, generators, compressors, fans, and the like, or any other suitable control parameter affecting the timing and intensity of noise and vibration resulting from operation of the transport climate control system. In an embodiment, the one or more operational parameters can include the charging of the RESS, for example charging the RESS prior to predicted occupant sleep states where the RESS will power components.

Where the operational parameters determined at 310 include set points for the transport climate control system, the set points can be varied to permit a wider range of temperatures for the space cooled by the transport climate control system. The variation of the set points can include raising a maximum temperature set point and/or lower a minimum temperature set point. The variation can reduce the number of times the compressor, fans, motor, generator, and the like are cycled on, for example reducing the periods of potential disruption. The variation to the set points can be for an entire occupant sleep period indicated by the occupant sleep status data or at times of light sleep such as Stage 1 and/or Stage 2 non-REM sleep. In an embodiment, the variation of the set points can further be modified by user preferences, such as users indicating a preference for a baseline level of noise. In an embodiment, the variation of set points can be subject to boundaries, for example restricting variation of set points based on a sensitivity of a load in the space cooled by the transport climate control system, such as pharmaceuticals, frozen goods, produce, or the like having particular limitations on temperature variation.

Where the operational parameters determined at 310 include permissions for operation of particular components of the transport climate control system, the particular components can be components associated with disruptive effects such as noise and/or vibration. The particular components can include, for example, motors, generators, compressors, fans and the like. The components can be restricted in operation or prohibited from operation during entire the occupant sleep period indicated by the occupant sleep status data or at times of light sleep such as Stage 1 and/or Stage 2 non-REM sleep. The permission for operation of the components can further be modified by user preferences, such as users indicating a preference for a baseline level of noise. In an embodiment, the permissions for the operations of components can be overridden by calls for climate control based on essential values that need to be maintained for some loads carried in spaces climate controlled by the transport climate control system, for example to avoid loss of sensitive loads such as pharmaceuticals or any other sensitive loads. In an embodiment, the permissions can allow operation of the components at certain levels associated with comparatively lower noise and/or vibration compared to ordinary or full-power operations, such as at limited compressor speeds or capacities, limited fan speeds, or the like.

Where the operational parameters determined at 310 include permissible power sources, the transport climate control system can be powered by, for example, a RESS during at least a portion of the occupant sleep period indicated by the occupant sleep status data or at times of light sleep such as Stage 1 and/or Stage 2 non-REM sleep. The transport climate control system can exclusively take power from the RESS, and be prohibited from taking power from a motor, generator, or any other such power source that could produce disruptive noise and vibration. In an embodiment, the use of the RESS as the power source can be overridden if the draw of power would be insufficient to operate the transport climate control system, for example based on a low state of charge for batteries of the RESS and high ambient temperatures. In an embodiment, the use of the RESS as the power source can be overridden based on the status of the RESS, for example as reported by the RESS management system. The status leading to override of the use of the RESS can be, for example, RESS temperature, RESS state or charge, or any other such suitable characteristic for determining if use of the RESS should be discontinued, for example to avoid loss of power, damage to the RESS, or the like.

Where the one or more operational parameters includes a schedule for operating components, the schedule can control operation of the transport climate control system over time during at least a portion of an occupant sleep state. The schedule can be based on predicted stages of sleep for the occupant. The stages of sleep can be predicted, for example, based on one or more of a sleep start time, biometric data indicative of sleep stages, a typical schedule or progression for the stages of sleep, individual sleep data, combinations of typical and individual data, and the like. The predicted sleep stages can include, for example, State 1, Stage 2, and Stage 3 non-REM sleep and REM sleep. In an embodiment, the schedule includes different set points for the transport climate control system used at different times corresponding to different levels of sleep of the occupant, such as, for example lower maximum and/or higher minimum set points during times predicted to correspond to stage 3 non-REM and REM sleep and higher maximum and/or lower minimum set points during times predicted to correspond stage 1 and stage 2 non-REM sleep. In an embodiment, the schedule includes different permissions and/or levels of operation for components associated with disruptive noise and/or vibration such as motors, generators, compressors, fans, and the like, for example prohibiting operation or restricting operations during stage 1 and stage 2 non-REM sleep and permitting operations or lifting restrictions during stage 3 non-REM sleep and REM sleep. In an embodiment, the schedule can modify periods at the beginning or end of an occupant sleep period based on occupant preferences and/or data, for example optional selections or data indicating that a particular occupant prefers or can tolerate some levels of noise and/or vibration.

The transport climate control system is operated according to the one or more operational parameters at 315. In an embodiment, the transport climate control system is operated using the setpoints determined at 310. In an embodiment, components are operated according to the permissions determined at 310, with motors, generators, compressors, fans, and the like being operated in a restricted mode or not operated according to the permissions determined at 310. In an embodiment, the transport climate control system is operated using only power from the RESS as determined at 310. In an embodiment, the operation of the transport climate control system over time is conducted according to the schedule determined at 310. In an embodiment, the operation at 315 can be interrupted or overridden as described above.

Figure 4:
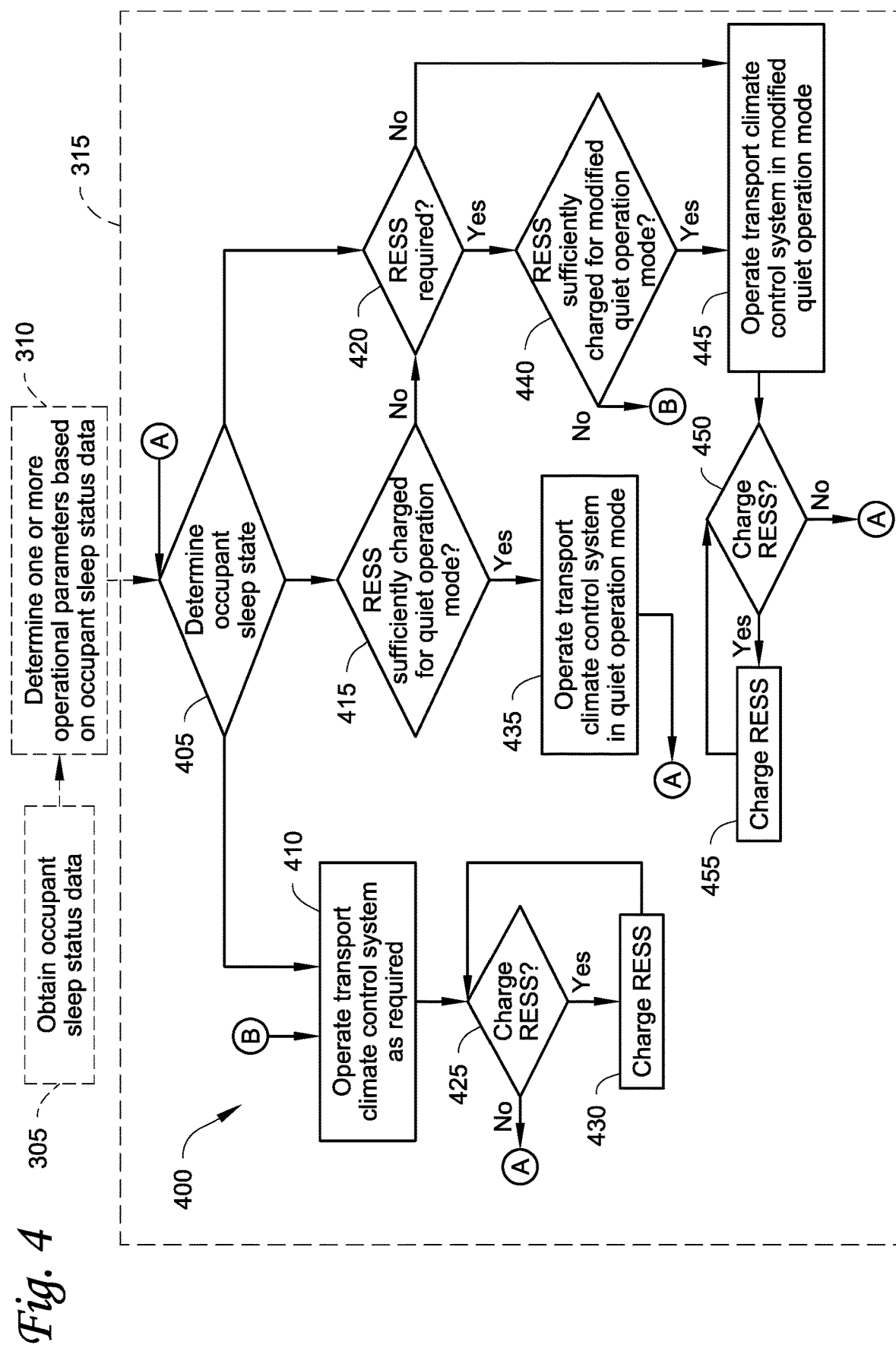
FIG. 4 illustrates a flowchart of a method operating a transport climate control system according to one or more operational parameters, according to an embodiment

FIG. 4 illustrates a flowchart of a method 400 for operating the transport climate control system according to one or more operational parameters (e.g., operating the transport climate control system at 315 based on the operational parameters determined at 310), according to one embodiment. The method 400 begins at 405 whereby a controller (e.g., the controller 245 shown in FIG. 2) determines/predicts a sleep state of an occupant of the vehicle based on occupant sleep status data. When the controller determines/predicts that the occupant is awake and/or would not be bothered by noise and vibration of various components of the transport climate control system, the method proceeds to 410. When the controller determines/predicts that the occupant, for example, is trying to sleep or in a light sleep stage, the method 400 proceeds to 415. When the controller determines/predicts that the occupant, for example, is in a deep stage of sleep, the method 400 proceeds to 420.

At 410, the controller determines/predicts, for example, that the occupant is awake and/or would not be bothered by noise and vibration of various components of the transport climate control system and instructs the transport climate control system to operate as required to provide the desired climate control within the climate controlled space of the transport unit. The controller can instruct the various components based on operational parameters determined, for example, at 310 in the method 300. This can include the controller instructing one or more components of the transport climate control system to operate, including for example, one or more of motor(s), generator(s), compressor(s), fan(s), etc. that may make sufficient noise and/or vibration that could prevent the occupant from sleeping. In some embodiments, the occupant can manually instruct the controller which components of the transport climate control system can be operated in this mode. The method 410 then proceeds to 425.

At 425, the controller determines a charge state of a RESS that can provide power to the transport climate control system (e.g., the RESS 210 shown in FIG. 2), determines whether the RESS is sufficiently charged, and determines whether a power source providing power to the transport climate control system at 410 (e.g., a generator such as the generator 205 shown in FIG. 2, a motor such as the motor 265 shown in FIG. 2, a utility power source, etc.) has sufficient power to concurrently charge the RESS. In some embodiments, the controller can determine that the RESS is sufficiently charged when the charge state of the RESS is above a preset charge threshold such as, for example, 70%. It will be appreciated that the charge threshold can be any preset charge percentage and typically between, for example, 50% and 100%. In an embodiment, the RESS can be charged to full charge. In an embodiment, whether the charge state of the RESS sufficient can be determined based on historical data regarding the under similar ambient conditions such as ambient temperature, solar intensity, time of day, current temperature of the conditioned space (i.e. pre-cooling), and the like to predict the energy required to maintain operations during operator sleep. In an embodiment, the preset charge range can be within a range selected based on values that optimize battery life, for example within 20% and 80% of the maximum state of charge of the battery for a lithium ion battery. When the controller determines that the RESS is sufficiently charged, the method 400 proceeds back to 405. When the controller determines that the RESS is not sufficiently charged, the method 400 proceeds to 430.

At 430, the controller instructs the power source to charge the RESS while concurrently providing power to the various components of the transport climate control system as required at 410. The method 400 then proceeds back to 425.

At 415, the controller determines a charge state of the RESS and determines whether the RESS has sufficient charge to power the transport climate control system in a quiet operation mode based on the operational parameters. In some embodiments, this can include the controller determining whether the RESS has sufficient charge to power the transport climate control system in the quiet operation mode by itself. In some embodiments, this can include the controller determining whether the RESS has sufficient charge to power the transport climate control system in the quiet operation mode with another power source (e.g., the motor, the generator, a utility power source, etc.).

In some embodiments, the controller can determine that the RESS is sufficiently charged to power the transport climate control system in the quiet operation mode when the charge state of the RESS is above a preset quiet operation mode charge threshold such as, for example, 70%. It will be appreciated that the quiet operation mode charge threshold can be any preset charge percentage and typically between, for example, 50% and 100%. In an embodiment, the charge state of the RESS sufficient to operate in the modified quiet operation mode can be determined based on historical data regarding the required energy for operation under similar ambient conditions such as ambient temperature, solar intensity, time of day, and the like. In an embodiment, the preset charge range can be within a range selected based on values that optimize battery life, for example within 20% and 80% of the maximum state of charge of the battery for a lithium ion battery. It will be appreciated that in some embodiments, the quiet operation mode charge threshold can be the same as the charge threshold at 425 and that in other embodiments the quiet operation mode charge threshold is different from the charge threshold at 425.

When the controller determines that the RESS does not have sufficient charge to power the transport climate control system in the quiet operation mode, the method 400 proceeds to 420.

At 435, the controller instructs the transport climate control system to operate in the quiet operation mode based on operational parameters determined, for example, at 310 in the method 300. This can include, for example, the controller instructing one or more components of the transport climate control system to not operate or operate at a low noise or a low speed mode. The components can include, for example, one or more of motor(s), generator(s), compressor(s), fan(s), etc. that may make sufficient noise and/or vibration that could prevent the occupant from sleeping. This can also include, for example, the controller instructing the RESS to provide power to operate the transport climate control system. The method 410 then proceeds to 405.

At 420, the controller determines whether the RESS is required to provide power to the transport climate control system in order for the transport climate control system to be operated in the modified quiet operation mode based on the occupant sleep status data and the operational parameters. When the controller determines that the RESS is required, the method 400 proceeds to 440. When the controller determines that the RESS is not required, the controller continues operation of the transport climate control system in the modified quiet operation mode and the method 400 proceeds to 445.

At 440, the controller determines a charge state of the RESS and determines whether the RESS has sufficient charge to power the transport climate control system in the modified quiet operation mode based on the sleep status data and the operational parameters. In some embodiments, this can include the controller determining whether the RESS has sufficient charge to power the transport climate control system in the modified quiet operation mode by itself. In some embodiments, this can include the controller determining whether the RESS has sufficient charge to power the transport climate control system in the modified quiet operation mode with another power source (e.g., the motor, the generator, a utility power source, etc.).

In some embodiments, the controller can determine that the RESS is sufficiently charged to operate in the modified quiet operation mode when the charge state of the RESS is above a preset modified quiet operation mode charge threshold such as, for example, 70%. It will be appreciated that the modified quiet operation mode charge threshold can be any preset charge percentage and typically between, for example, 50% and 100%. In an embodiment, the charge state of the RESS sufficient to operate in the modified quiet operation mode can be determined based on historical data regarding the required energy for operation under similar ambient conditions such as ambient temperature, solar intensity, time of day, and the like. In an embodiment, the preset charge range can be within a range selected based on values that optimize battery life, for example within 20% and 80% of the maximum state of charge of the battery for a lithium ion battery. It will be appreciated that in some embodiments, the modified quiet operation mode charge threshold can be the same as the charge threshold at 425 and/or the quiet operation mode charge threshold at 415, and that in other embodiments the modified quiet operation mode charge threshold is different from the charge threshold at 425 and/or the quiet operation mode charge threshold at 415.

When the controller determines that the RES S does not have sufficient charge to power the transport climate control system in the modified quiet operation mode, the method 400 proceeds to 410. When the controller determines that the RESS does have sufficient charge to operate the transport climate control system in the modified quiet operation mode, the method 400 proceeds to 445.

At 445, the controller instructs the transport climate control system to operate in a modified quiet operation mode based on operational parameters determined, for example, at 310 in the method 300. The modified quiet operation mode can vary based on, for example, occupant sleep status data obtained, for example, at 305 in the method 300. Based on the occupant sleep status data, the controller can determine, for example, which components of the transport climate control system can operate as required and which components should at a low noise or a low speed mode. The components can include, for example, one or more of motor(s), generator(s), compressor(s), fan(s), etc. that may make sufficient noise and/or vibration that could prevent the occupant from sleeping. This can also include, for example, the controller instructing the RESS and/or another power source (e.g., the generator, the motor, a utility power source, etc.) to provide power to operate the transport climate control system. In some embodiments, the occupant can manually instruct the controller which components of the transport climate control system can be operated in this mode. The method 410 then proceeds to 450.

At 450, the controller determines a charge state of a RESS that can provide power to the transport climate control system, determines whether the RESS is sufficiently charged, and determines whether another power source (if applicable) is providing power to the transport climate control system at 445 (e.g., the generator, the motor, a utility power source, etc.) has sufficient power to concurrently charge the RESS. In some embodiments, the controller can determine that the RESS is sufficiently charged when the charge state of the RESS is above a preset charge threshold such as, for example, 70%. It will be appreciated that the charge threshold can be any preset charge percentage and typically between, for example, 50% and 100%. In an embodiment, the charge state of the RESS sufficient to operate in the modified quiet operation mode can be determined based on historical data regarding the required energy for operation under similar ambient conditions such as ambient temperature, solar intensity, time of day, and the like. In an embodiment, the preset charge range can be within a range selected based on values that optimize battery life, for example within 20% and 80% of the maximum state of charge of the battery for a lithium ion battery. When the controller determines that the RESS is not sufficiently charged and determines that another power source has sufficient power to concurrently charge the RESS and power the transport climate control system in the modified quiet operation mode, the method 400 proceeds to 455. When the controller determines that the RESS is either sufficiently charged or that another power source does not have sufficient power to concurrently charge the RESS and power the transport climate control system in the modified quiet operation mode, the method 400 proceeds back to 405.

At 455, the controller instructs the power source to charge the RESS while concurrently providing power to the various components of the transport climate control system as required at 445. The method 400 then proceeds back to 405.

Aspects:

It is understood that any of aspects 1-10 can be combined with any of aspects 11-14 or 15-17. It is understood that any of aspects 11-14 may be combined with any of aspects 15-17.

Aspect 1. A method of operating a transport climate control system, comprising:
obtaining occupant sleep status data;
determining one or more operational parameters of the transport climate control system based on the occupant sleep status data; and
operating the transport climate control system according to the one or more operational parameters to control when at least one of a motor, a compressor, a generator, or one or more fans are in operation during an occupant sleep state.

Aspect 2. The method according to aspect 1, wherein the occupant sleep status data includes an occupant sleep schedule.

Aspect 3. The method according to any of aspects 1-2, wherein the occupant sleep status data includes a driving time of a vehicle including the transport climate control system.

Aspect 4. The method according to any of aspects 1-3, wherein the occupant sleep status data includes occupant biometric data.

Aspect 5. The method according to any of aspects 1-4, wherein the one or more operational parameters include at least one of a temperature set point of the transport climate control system or a permitted drift from a set point of the transport climate control system.

Aspect 6. The method according to any of aspects 1-5, further comprising charging a rechargeable energy storage source prior to the occupant sleep state.

Aspect 7. The method according to any of aspects 1-6, wherein operating the transport climate control system according to the one or more operational parameters comprises prohibiting operation of at least one of the motor, the compressor, the generator, or the one or more fans during a period defined based on an occupant sleep stage.

Aspect 8. The method according to aspect 7, wherein the period defined based on the occupant sleep stage includes one or more periods associated with Stage 1 non-REM sleep.

Aspect 9. The method according to aspect 8, wherein the one or more periods associated with Stage 1 non-REM sleep are identified based on occupant biometric data.

Aspect 10. The method according to aspect 8, wherein the one more periods associated with Stage 1 non-REM sleep are identified based on a schedule of predicted sleep stages.

Aspect 11. A transport climate control system, comprising:
a motor;
a climate control circuit including:
a compressor; and
one or more fans; and
a controller, configured to:
obtain occupant sleep status data;
determine one or more operational parameters of the transport climate control system based on the occupant sleep status data; and
operate the transport climate control system according to the one or more operational parameters to control when at least one of the motor, the compressor, or the one or more fans are in operation during an occupant sleep state.

Aspect 12. The transport climate control system according to aspect 11, further comprising a generator, and wherein the controller is configured to operate the transport climate control system according to the one or more operational parameters to control when a generator is in operation during an occupant sleep state.

Aspect 13. The transport climate control system according to any of aspects 11-12, further comprising a biometric reader.

Aspect 14. The transport climate control system according to aspect 13, wherein the biometric reader is a wearable device and the biometric reader configured to communicate with the controller through wireless connection.

Aspect 15. A control module for a transport climate control system, comprising:
a controller configured to:
obtain occupant sleep status data;
determine one or more operational parameters of the transport climate control system based on the occupant sleep status data; and
direct operation of the transport climate control system according to the one or more operational parameters to control when at least one of a motor, a compressor, or one or more fans of the transport climate control system are in operation during an occupant sleep state.

Aspect 16. The control module according to aspect 15, wherein the controller is configured to direct operation the transport climate control system according to the one or more operational parameters to control when a generator is in operation during an occupant sleep state Aspect 17. The control module according to any of aspects 15-16, further comprising a wireless communication antenna and wherein the controller is configured to obtain data from a biometric reader from the wireless communication antenna.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of operating a transport climate control system, comprising:
obtaining occupant sleep status data, wherein the occupant sleep status data includes at least one of an occupant sleep schedule or a driving time of a vehicle including the transport climate control system;
determining one or more operational parameters of the transport climate control system based on the occupant sleep status data; and
operating the transport climate control system according to the one or more operational parameters to control when at least one of a motor, a compressor, a generator, or one or more fans are in operation during an occupant sleep state.

2. The method of claim 1, wherein the occupant sleep status data includes the occupant sleep schedule.

3. The method of claim 1, wherein the occupant sleep status data includes the driving time of the vehicle including the transport climate control system.

4. The method of claim 1, wherein the occupant sleep status data includes occupant biometric data.

5. The method of claim 1, wherein the one or more operational parameters include at least one of a temperature set point of the transport climate control system or a permitted drift from a set point of the transport climate control system.

6. The method of claim 1, further comprising charging a rechargeable energy storage source prior to the occupant sleep state.

7. The method of claim 1, wherein operating the transport climate control system according to the one or more operational parameters comprises prohibiting operation of at least one of the motor, the compressor, the generator, or the one or more fans during a period defined based on an occupant sleep stage.

8. The method of claim 7, wherein the period defined based on the occupant sleep stage includes one or more periods associated with Stage 1 non-REM sleep.

9. The method of claim 8, wherein the one or more periods associated with Stage 1 non-REM sleep are identified based on occupant biometric data.

10. The method of claim 8, wherein the one more periods associated with Stage 1 non-REM sleep are identified based on a schedule of predicted sleep stages.

11. A transport climate control system, comprising:
a motor;
a climate control circuit including:
a compressor; and
one or more fans; and
a controller, configured to:
obtain occupant sleep status data, wherein the occupant sleep status data includes at least one of an occupant sleep schedule or a driving time of a vehicle including the transport climate control system;
determine one or more operational parameters of the transport climate control system based on the occupant sleep status data; and
operate the transport climate control system according to the one or more operational parameters to control when at least one of the motor, the compressor, or the one or more fans are in operation during an occupant sleep state.

12. The transport climate control system of claim 11, further comprising a generator, and wherein the controller is configured to operate the transport climate control system according to the one or more operational parameters to control when a generator is in operation during an occupant sleep state.

13. The transport climate control system of claim 11, further comprising a biometric reader.

14. The transport climate control system of claim 13, wherein the biometric reader is a wearable device and the biometric reader configured to communicate with the controller through wireless connection.

15. A control module for a transport climate control system, comprising:
a controller configured to:
obtain occupant sleep status data, wherein the occupant sleep status data includes at least one of an occupant sleep schedule or a driving time of a vehicle including the transport climate control system;
determine one or more operational parameters of the transport climate control system based on the occupant sleep status data; and
direct operation of the transport climate control system according to the one or more operational parameters to control when at least one of a motor, a compressor, or one or more fans of the transport climate control system are in operation during an occupant sleep state.

16. The control module of claim 15, wherein the controller is configured to direct operation the transport climate control system according to the one or more operational parameters to control when a generator is in operation during an occupant sleep state.

17. The control module of claim 15, further comprising a wireless communication antenna and wherein the controller is configured to obtain data from a biometric reader from the wireless communication antenna.

* * * * *